United States Patent
Bourgois et al.

(10) Patent No.: US 11,739,936 B2
(45) Date of Patent: Aug. 29, 2023

(54) INJECTION SYSTEM FOR TURBOMACHINE, COMPRISING A SWIRLER AND MIXING BOWL VORTEX HOLES

(71) Applicant: SAFRAN AIRCRAFT ENGINES, Paris (FR)

(72) Inventors: Sébastien Alain Christophe Bourgois, Moissy-Cramayel (FR); Romain Nicolas Lunel, Moissy-Cramayel (FR); Haris Musaefendic, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/419,919

(22) PCT Filed: Dec. 18, 2019

(86) PCT No.: PCT/FR2019/053163
§ 371 (c)(1),
(2) Date: Jun. 30, 2021

(87) PCT Pub. No.: WO2020/144416
PCT Pub. Date: Jul. 16, 2020

(65) Prior Publication Data
US 2022/0082259 A1   Mar. 17, 2022

(30) Foreign Application Priority Data

Jan. 8, 2019  (FR) ........................................ 1900169

(51) Int. Cl.
*F23R 3/14* (2006.01)
*F23R 3/28* (2006.01)

(52) U.S. Cl.
CPC ................ *F23R 3/14* (2013.01); *F23R 3/286* (2013.01)

(58) Field of Classification Search
CPC .................................... F23R 3/14; F23R 3/286
See application file for complete search history.

(56) References Cited

U.S. PATENT DOCUMENTS

| 3,643,431 | A | * | 2/1972 | Jamieson | .................. | F01D 9/00 |
| | | | | | | 60/39.23 |
| 3,736,746 | A | * | 6/1973 | DuBell | ..................... | F23R 3/14 |
| | | | | | | 60/737 |

(Continued)

FOREIGN PATENT DOCUMENTS

| FR | 2903169 A1 | 1/2008 |
| FR | 2948749 A1 | 2/2011 |
| FR | 2956725 A1 | 8/2011 |

OTHER PUBLICATIONS

Search Report issued in French Patent Application No. 1900169 dated Aug. 26, 2019.

(Continued)

*Primary Examiner* — William H Rodriguez
(74) *Attorney, Agent, or Firm* — Pearne & Gordon LLP

(57) ABSTRACT

An injection system for a turbomachine combustion chamber includes a swirler and a mixing bowl. The mixing bowl includes a converging frustoconical portion and a diverging frustoconical portion. The diverging frustoconical portion is connected to the converging frustoconical portion, forming a continuous aerodynamic profile with the converging frustoconical portion. The diverging frustoconical portion is passed through by vortex holes which each includes a circumferential component around a longitudinal axis of the injection system and an axial component along the longitudinal axis of the injection system.

15 Claims, 3 Drawing Sheets

(56) References Cited

U.S. PATENT DOCUMENTS

| | | | | |
|---|---|---|---|---|
| 3,853,273 | A * | 12/1974 | Bahr | F23R 3/14 239/404 |
| 4,180,974 | A * | 1/1980 | Stenger | F23R 3/14 60/756 |
| 5,197,290 | A * | 3/1993 | Lee | F23R 3/26 60/794 |
| 6,199,367 | B1 * | 3/2001 | Howell | F23R 3/14 60/39.23 |
| 6,212,870 | B1 * | 4/2001 | Thompson | F23R 3/60 60/746 |
| 7,926,281 | B2 * | 4/2011 | Commaret | F23D 14/78 60/737 |
| 8,033,114 | B2 * | 10/2011 | Hernandez | F23R 3/14 60/737 |
| 2005/0044854 | A1 * | 3/2005 | Cazalens | F23R 3/286 60/740 |
| 2007/0033950 | A1 * | 2/2007 | Bernier | F23R 3/14 60/740 |
| 2008/0000234 | A1 * | 1/2008 | Commaret | F23D 11/107 60/748 |
| 2009/0038312 | A1 * | 2/2009 | Hernandez | F23D 11/36 60/748 |
| 2009/0049840 | A1 * | 2/2009 | Cayre | F23R 3/28 60/737 |
| 2010/0308135 | A1 * | 12/2010 | Yamamoto | F23R 3/343 239/402 |
| 2012/0304649 | A1 * | 12/2012 | Matsuyama | F23R 3/14 60/737 |
| 2014/0090381 | A1 * | 4/2014 | Rullaud | F23R 3/20 60/740 |
| 2015/0159874 | A1 * | 6/2015 | Toon | F23D 11/107 60/737 |
| 2018/0266693 | A1 * | 9/2018 | Patel | F23R 3/286 |
| 2020/0025386 | A1 * | 1/2020 | Muldal | F23R 3/343 |
| 2020/0032749 | A1 | 1/2020 | Bourgois et al. | |
| 2020/0248903 | A1 * | 8/2020 | Sampath | F23R 3/286 |

OTHER PUBLICATIONS

International Search Report for issued in Application No. PCT/FR2019/053163 dated Apr. 14, 2020.

Written Opinion for PCT/FR2019/053163 dated Apr. 14, 2020.

* cited by examiner

INJECTION SYSTEM FOR TURBOMACHINE, COMPRISING A SWIRLER AND MIXING BOWL VORTEX HOLES

This is the National Stage of PCT international application PCT/FR2019/053163, filed on Dec. 18, 2019 entitled "INJECTION SYSTEM FOR TURBOMACHINE, COMPRISING A SWIRLER AND MIXING BOWL VORTEX HOLES", which claims the priority of French Patent Application No. 1900169 filed Jan. 8, 2019, both of which are incorporated herein by reference in their entirety.

TECHNICAL FIELD

The invention relates to the general technical field of aircraft turbomachines, such as turbojet engines and turbopropellers. It relates to an injection system for a turbomachine combustion chamber.

BACKGROUND OF THE INVENTION

A turbomachine annular combustion chamber generally comprises a plurality of injection systems which are inserted in openings in a bottom of the combustion chamber. A fuel injector is housed in each of the injection systems.

Snecma patent application FR 2 903 169 relates to an injection system which comprises an internal swirler, a venturi and a mixing bowl. The mixing bowl comprises vortex holes. These mixing bowl vortex holes are located radially outside the venturi and around the venturi. They are located in an upstream portion of the mixing bowl, which is cylindrical with circular cross-section.

The size of the injection system of application FR 2 903 169 is limited, while allowing relatively satisfactory spraying of the fuel into the combustion chamber.

The injection system is difficult to manufacture due to its small dimensions. Furthermore, the flow inside the venturi is not entirely satisfactory, in particular since a film of air and fuel mixture is likely to be deposited on the inner wall of the venturi. The size and mass of the injection system can be further reduced.

DISCLOSURE OF THE INVENTION

The invention aims to at least partially solve the problems encountered in the solutions of the prior art.

To this end, the object of the invention is an injection system for a turbomachine combustion chamber. The injection system comprises a swirler and an air-fuel mixing bowl.

According to the invention, the mixing bowl comprises a converging frustoconical portion and a diverging frustoconical portion around a longitudinal axis of the injection system. The converging frustoconical portion is connected to the swirler. The diverging frustoconical portion is connected to the converging frustoconical portion, forming a continuity of aerodynamic profile between, on the one hand, a converging inner face of the converging frustoconical portion and, on the other hand, a diverging inner face of diverging frustoconical portion. The diverging frustoconical portion is passed through by vortex holes, which each define a channel extending along a main axis, comprising an axial component extending along the longitudinal axis of the injection system and a circumferential component around the longitudinal axis of the injection system, the axial component and the tangential component both being non-zero.

Thanks to the vortex holes, the injection system can comprise a sole swirler. The structure of the mixing bowl can also remove the need for a venturi which is conventionally situated between a swirler and the mixing bowl. This may result in a reduced size and a limitation of the mass of the injection system, while allowing satisfactory spraying of the air-fuel mixture into the combustion chamber. Furthermore, the injection system tends to be easier to manufacture.

In particular, the atomisation of the air-fuel mixture into the combustion chamber is satisfactory. There are no more problems with flow of the air-fuel mixture in a venturi which has been eliminated.

Due to the presence of a sole swirler and the absence of a venturi, the injection system is easier to manufacture. The single swirler of the injection system has a larger diameter around the longitudinal axis of the injection system, and the diameter of the holes in the mixing bowl forming the vortex holes is increased, which further facilitates the manufacture of the injection system.

The presence of a sole swirler and the absence of a venturi tends to reduce the mass and size of the injection system.

The invention can optionally include one or more of the following features, alone or combined.

Advantageously, the ratio of an axial length of the converging frustoconical portion over an axial length of the diverging frustoconical portion is less than 1, in particular strictly less than 1.

Advantageously, the ratio of an angle of the outer wall of the converging frustoconical portion relative to the longitudinal axis of the injection system, over an angle of the outer wall of the diverging frustoconical portion relative to the longitudinal axis of the injection system is between 0.8 and 1.2, and being, in particular, substantially equal to 1.

According to a particular embodiment, the injection system comprises a housing socket which is configured to house an injector nose in a movable manner relative to the swirler and the mixing bowl. The housing socket is connected to the swirler.

According to another particular embodiment, the vortex holes are all substantially distributed over at least one annular row around the longitudinal axis of the injection system. The vortex holes are preferably all distributed over one sole annular row around the longitudinal axis of the injection system.

According to a particular embodiment, the vortex holes are axially closer to the outlet of the mixing bowl than to a connection area of the diverging frustoconical portion to the converging frustoconical portion.

According to a particular embodiment, the circumferential components of all the vortex holes are oriented in a same direction relative to the longitudinal axis of the injection system.

The vortex holes are preferably circumferentially inclined at an angle which is less than or equal to 60° relative to the longitudinal axis of the injection system.

According to a particular embodiment, all the vortex holes are axially inclined downstream with respect to the longitudinal axis of the injection system.

All the vortex holes are preferably inclined axially downstream with respect to the longitudinal axis of the injection system at an angle which is substantially equal to 45° with respect to the longitudinal axis of the injection system.

According to a particular embodiment, the injection system comprises a single swirler. The swirler comprises a plurality of blades distributed over substantially one sole annular row.

According to a particular embodiment, the blades of the swirler are each oriented circumferentially in a first direction around the longitudinal axis of the injection system. The vortex holes are each oriented circumferentially in a second direction which is opposite to the first direction relative to the longitudinal axis of the injection system.

According to a particular embodiment, the mixing bowl comprises a collar and a connection shroud. The collar is located downstream of the diverging frustoconical portion. The collar extends radially relative to the longitudinal axis of the injection system. The connection shroud is configured to connect the mixing bowl to a combustion chamber bottom and/or to a combustion chamber deflector. The connection shroud is connected to the diverging frustoconical portion, extending upstream. Cooling orifices which are oriented axially towards the collar, pass through the connection shroud.

The invention also relates to a combustion chamber comprising such an injection system as defined above.

According to a particular embodiment, the combustion chamber comprises a chamber bottom, a deflector, an upstream retention member and the injection system. The injection system comprises a radial wall segment that is axially located between the upstream retaining member and the deflector, in order to limit the axial movement of the injection system relative to the combustion chamber bottom.

BRIEF DESCRIPTION OF THE FIGURES

The present invention will be better understood on reading the description of the embodiments, given purely by way of indication and in no way limiting, by making reference to the attached drawings, in which.

DETAILED DISCLOSURE OF SPECIAL EMBODIMENTS

Identical, similar or equivalent parts of the various figures are given the same reference numbers in order to facilitate the passage from one figure to another.

Figure 1:
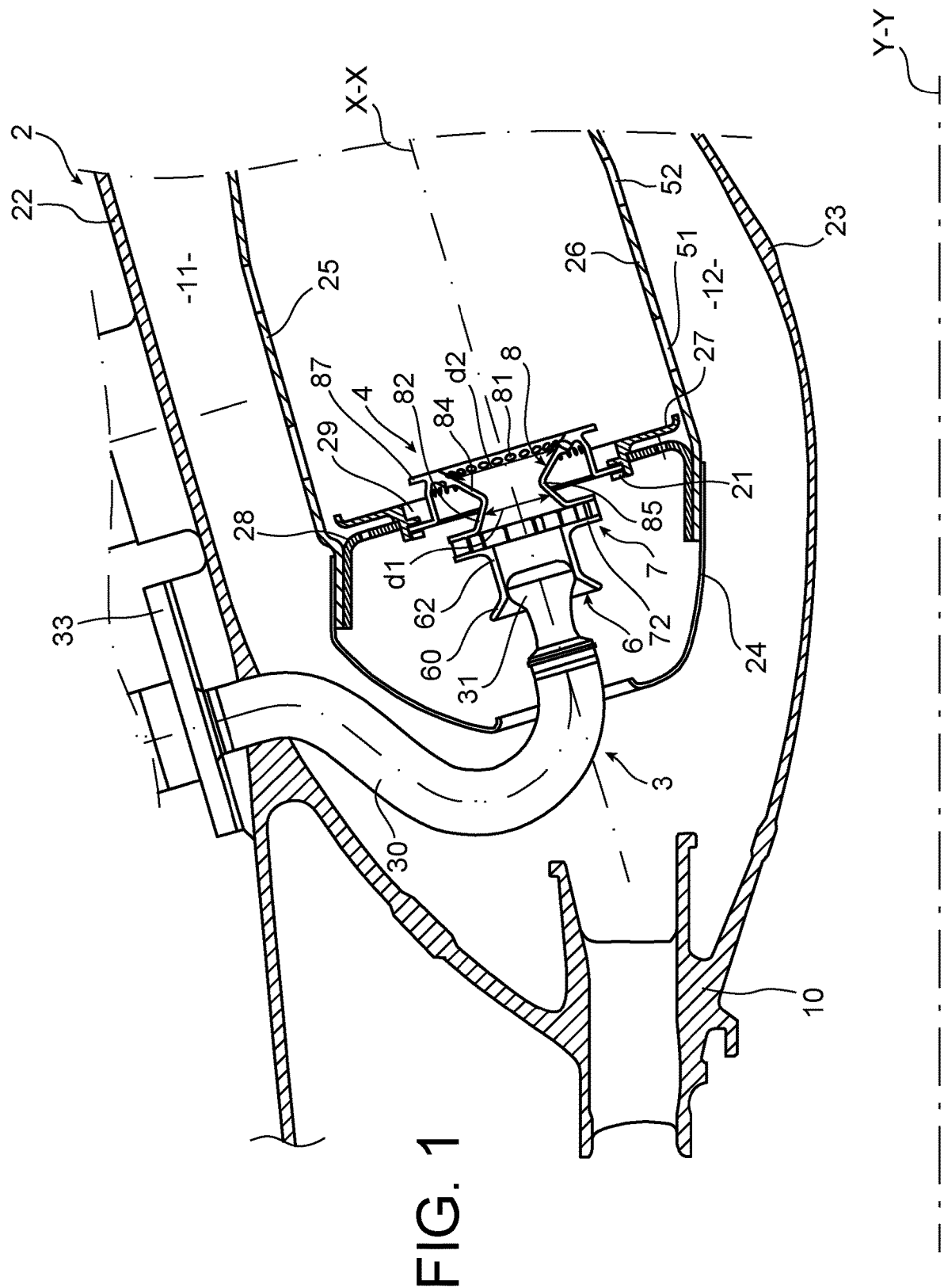
FIG. 1 is a partial schematic representation in a longitudinal half section, of a turbomachine combustion chamber according to a first embodiment of the invention.

FIG. 1 represents, in schematic manner, a combustion chamber 2 of an aircraft turbomachine. The combustion chamber 2 is annular around a longitudinal axis Y-Y of the turbomachine.

It has an outer casing wall 22 and an inner casing wall 23, a fairing 24, an outer wall 25 and an inner wall 26 which are joined by a chamber bottom 28.

It also comprises injectors 3, injection systems 4 and a diffuser 10 and upstream retention members 21 of the injection systems 4.

The outer casing wall 22 delimits the combustion chamber 2 radially outwards with respect to the longitudinal axis Y-Y of the turbomachine. The inner casing wall 23 is radially located towards the inside with respect to the outer wall 22 relative to the longitudinal axis Y-Y of the turbomachine.

The outer casing wall 22 delimits, with the outer wall 25, a first air flow passage 11. Similarly, the inner casing 23 defines, with the inner wall 26, a second air flow passage 12.

An "upstream" direction and the "downstream" direction are defined by the general flow direction of the air and the fuel in the combustion chamber 2. This direction also substantially corresponds to the general direction of flow of exhaust gases in the turbomachine.

The outer wall 25 and the inner wall 26 are walls shaped as a solid of revolution which are coaxial around the turbomachine longitudinal axis Y-Y. They each comprise primary orifices 51 for introduction of a primary airflow and dilution orifices 52 for introduction of a dilution air flow into the flame tube of the combustion chamber 2.

The fairing 24 extends upstream from the outer wall 25 and the inner wall 26 being located upstream of the chamber bottom 28. It has central openings for housing injection systems 4 and corresponding injectors 3.

The chamber bottom 28 has openings 29 for mounting injection systems 4. These openings 29 are, for example, circular.

The diffuser 10 is configured to supply air to the combustion chamber 2, in particular the injection systems 4, the primary orifices 51 and the dilution orifices 52.

Each upstream retention member 21 is an annular ring which interacts with the deflector 27 in delimiting a housing for a radial rim 89 of the mixing bowl 8.

Each fuel injector 3 is of the aeromechanical type, in other words the fuel pressure inside the injector 3 is used to spray the fuel at the outlet of the injector 3.

Each injector 3 has a primary fuel circuit and a secondary fuel circuit. The primary circuit is intended, for example, for an ignition and low-power phase. The secondary circuit acts in the medium-power to high-power operating phases, in addition to the primary circuit.

Each fuel injector 3 comprises an injection tube 30, an injector nose 31 and a securing plate 33. The securing plate 33 is used to secure the injector 3 to the outer casing wall 22 of the combustion chamber. The injector nose 31 comprises the fuel outlet of the injector 3 and is designed to be inserted in a housing socket 6 of the corresponding injection system 4. The injection tube 30 extends between the securing plate 33 and the injector nose 31, and it supplies the injector nose 31 with fuel.

The ignition systems 4 are mounted in the openings 29 of the chamber bottom 28, being spaced apart from one another in a circumferential direction around the longitudinal axis Y-Y of the turbomachine. Each injection system 4 is annular around its longitudinal axis X-X which can be inclined with respect to the direction of the longitudinal axis Y-Y of the turbomachine.

Figure 5:
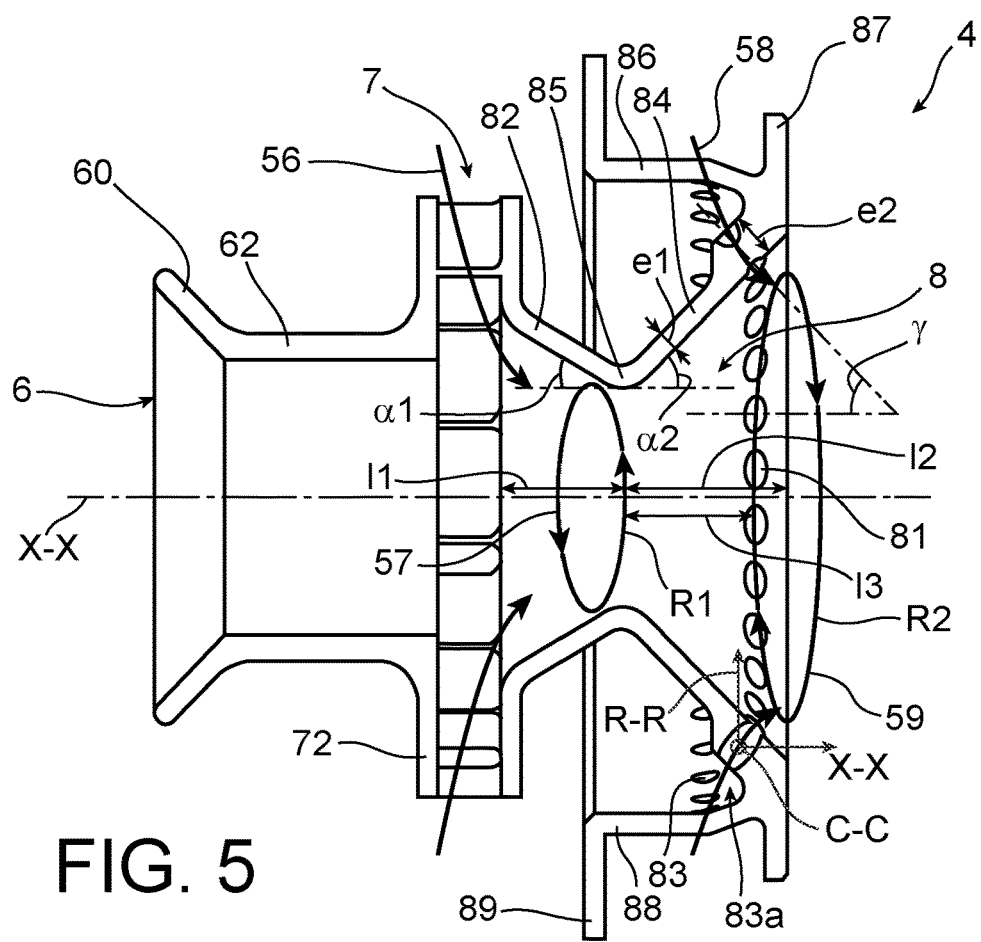
FIG. 5 is a partial schematic representation in a longitudinal half section of a flow of an air and fuel mixture passing through the injection system according to the first embodiment.

In the remainder of the disclosure and with reference, in particular, to FIG. 5, an axial direction is a direction along the longitudinal axis X-X of an injection system. A circumferential direction C-C or tangential direction is a direction which is substantially orthogonal locally to the direction of the longitudinal axis X-X of an injection system, around the longitudinal axis X-X of the injection system. A radial direction R-R is a direction which is substantially orthogonal locally to the direction of the longitudinal axis X-X of an injection system and the circumferential direction C-C, being secant with the longitudinal axis X-X of the injection system. The reference frame R-R, C-C, X-X is an orthonormal reference frame in cylindrical coordinates.

In joint reference to FIGS. 1 to 5, each injection system 4 comprises, from upstream to downstream, a housing socket 6, a swirler 7 and a mixing bowl 8.

The housing socket 6, the swirler 7 and the mixing bowl 8 jointly form means for supplying air in order to produce a sheet of air-fuel mixture with the fuel injected by the corresponding injector 3.

The housing socket 6 is rigidly attached to the swirler 7, being in particular integral with the swirler 7. The housing socket 6 comprises a flared portion 60 for pre-centring the injector nose 31, and a cylindrical portion 62 for centring the injector nose 31. The housing socket 6 is configured for positioning the injector nose 31, immobilising it relative to the swirler 7 and the mixing bowl 8. More generally, the connection socket 6 is configured to mechanically and fluidically connect an injector nose 31 to the swirler 7.

Figure 2:
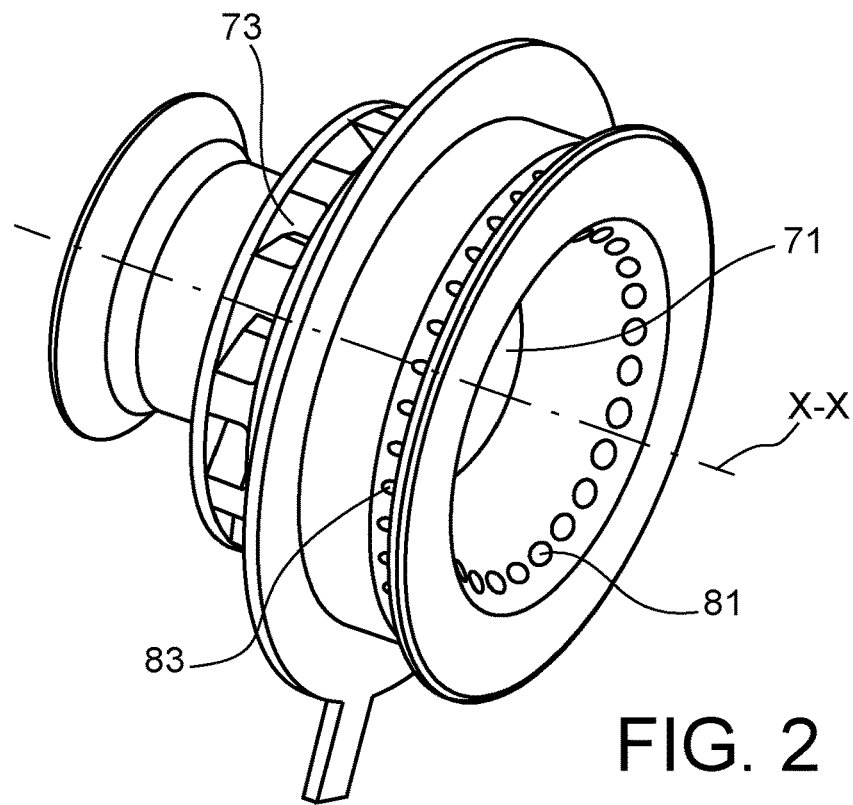
FIG. 2 is a partial schematic representation in perspective view of an injection system for a combustion chamber, according to the first embodiment.
Figure 3:
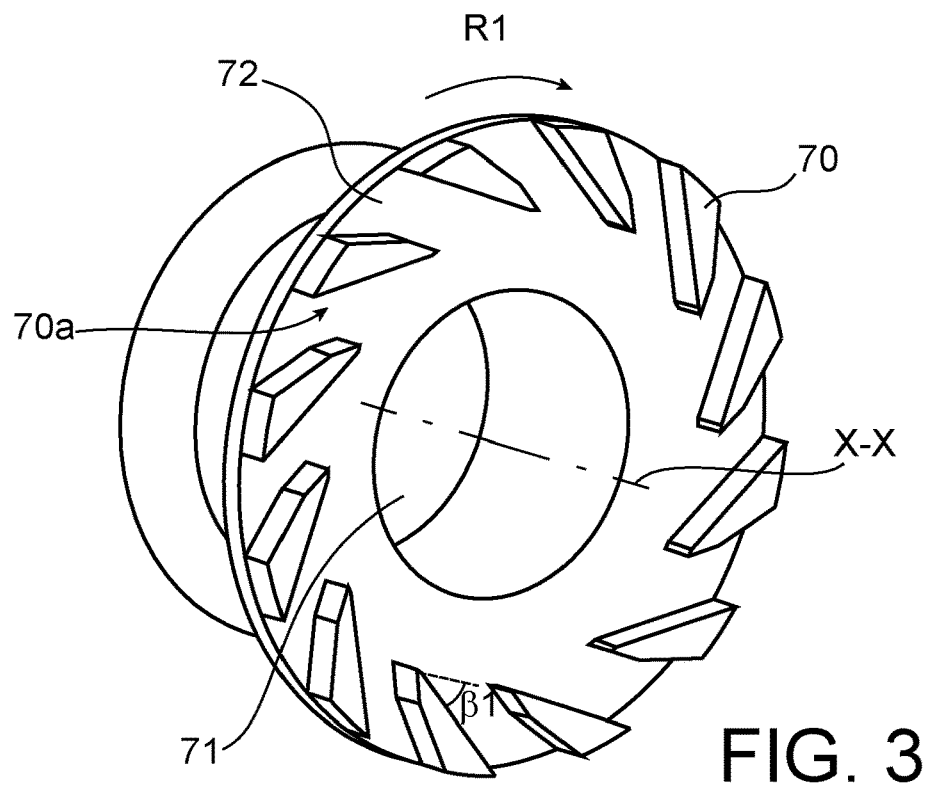
FIG. 3 is a partial schematic representation in perspective view of an upstream portion of the injection system according to the first embodiment
Figure 4:
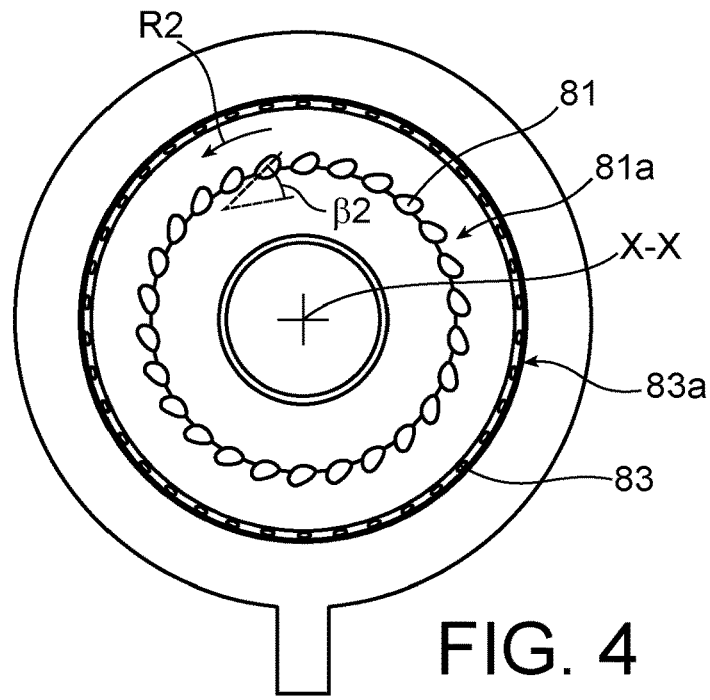
FIG. 4 is a planar view looking downstream from the upstream portion of the injection system according to the first embodiment.

With reference more specifically to FIGS. 2, 3 and 5, the swirler 7 is the sole swirler 7 of the injection system 4. It is rigidly attached to the mixing bowl 8, being, in particular, integral with the mixing bowl 8. The swirler 7 has blades 70, a central conduit 71, a radial support wall 72 for the blades, and air inlet orifices 73 which open into the central conduit 71.

The swirler 7 is used to rotate the air-fuel mixture which crosses it, around the longitudinal axis X-X of the injection system. In the embodiment shown, the air which is introduced by the air inlet orifices 73 is rotated in a first direction $R_1$.

The swirler 7 has a single stage of blades 70. These blades 70 are distributed over one sole angular row 70a on the radial support wall 72. The blades 70 are circumferentially oriented in the same direction, referred to as first direction $R_1$, around the longitudinal axis X-X of the injection system. In other words, they each have a circumferential component along the first direction $R_1$ relative to the longitudinal axis X-X of the injection system. Each of the blades is inclined with a pitch angle $\beta_1$ which has a value greater than 65°. This pitch angle $\beta_1$ represents the inclination of the intrados wall of the blades 70 relative to a radial direction with respect to the longitudinal axis X-X of the injection system.

Given that the swirler 7 comprises a sole stage of blades 70, it has a larger diameter than a swirler with two stages of blades 70. Furthermore, the pitch angle $\beta_1$ of the blades is larger than with several stages of swirler.

With reference, more specifically, to FIGS. 1, 2, 4 and 5, the mixing bowl 8 comprises a converging frustoconical portion 82 and a diverging frustoconical portion 84 which is connected to the converging frustoconical portion 82 by a connection area 85. The mixing bowl 8 comprises a connection shroud 86 and a collar 87 which are connected to the diverging frustoconical portion 84. The mixing bowl 8 is in one piece.

The converging frustoconical portion 82 is connected to the swirler 7 which it delimits in the downstream direction. The outer wall of the converging frustoconical portion 82 is inclined at an angle $\alpha_1$ relative to the longitudinal axis X-X of the injection system, for example at 45°. The converging frustoconical portion 82 extends axially over an axial length $l_1$. It has an average diameter $d_1$. The outer wall of the converging frustoconical portion 82 has a thickness $e_1$ which is substantially uniform. The converging frustoconical portion 82 tends to increase the speed of the mixture of air and fuel which passes through it.

The diverging frustoconical portion 84 is connected to the converging frustoconical portion 82 by the connection area 85, forming a continuous aerodynamic profile with the converging frustoconical portion 82. More precisely, the inner face of the converging frustoconical portion 82 forms a continuity of aerodynamic profile with the inner face of the diverging frustoconical portion 84 for the air-fuel mixture. Vortex holes 81 pass through the diverging frustoconical portion 84 in its downstream portion.

The outer wall of the diverging frustoconical portion 84 is inclined at an angle $\alpha_2$ relative to the longitudinal axis X-X of the injection system, for example 45°. The diverging frustoconical portion 84 extends axially over an axial length $l_2$. It has an average diameter $d_2$ which is strictly greater than that of the converging frustoconical portion 82. The outer wall of the diverging frustoconical portion 84 has an excess thickness $e_2$ at the vortex holes 81 which pass through it, in particular with respect to the thickness $e1$ of the outer wall of the converging frustoconical portion 82 and/or the average thickness of the outer wall of the diverging frustoconical portion 84. The diverging frustoconical portion 84 tends to increase the static pressure and to reduce the speed of the air and fuel mixture which passes through it.

With reference more specifically to FIG. 5, the ratio of an axial length $l_1$ of the converging frustoconical portion 82 over an axial length $l_2$ of the diverging frustoconical portion 84 is strictly less than 1. In other words, the diverging frustoconical portion 84 has an axial length greater than that of the converging frustoconical portion 82.

The ratio of the angle $\alpha_1$ of the converging frustoconical portion 82 over the angle $\alpha_2$ of the diverging frustoconical portion 84 is, for example, substantially equal to 1.

With reference more specifically to FIG. 5, the connection shroud 86 comprises a cylindrical connection portion 88 and a radial rim 89. The connection shroud 86 is configured to connect the mixing bowl 8 to the deflector 27, and to connect the mixing bowl 8 to the chamber bottom 28.

The cylindrical connection portion 88 is cylindrical around the longitudinal axis X-X of the injection system. It is connected to the diverging frustoconical portion 84 extending axially in the upstream direction and radially outwards with respect to the diverging frustoconical portion 84. It axially connects the radial rim 89 to the collar 87.

Cooling orifices 83 pass through the cylindrical connection portion 88. The cooling orifices are axially oriented downstream and radially outwards, in the direction of the collar 87. The cooling orifices 83 are distributed over a sole annular row 83a.

The regional rim 89 is intended to be axially located between the upstream retaining member 21 and the deflector 27, in order to limit the axial movement of the injection system 4 relative to the combustion chamber bottom 28.

The collar 87 is located upstream of the diverging frustoconical portion 84. It is used to cool the deflector 27 by guiding, towards the deflector 27, the air which passes through the cooling holes 83 towards the collar 87.

In general, the vortex holes 81 are all substantially distributed over at least one annular row 81a around the longitudinal axis X-X of the injection system. In the illustrated embodiment, the vortex holes 81 are all distributed over a sole annular row 81a.

The vortex holes 81 are axially closer to the outlet of the mixing bowl 8 than to the connection area 85 of the diverging frustoconical portion 84 to the converging frustoconical portion 82.

With reference more specifically to FIG. 5, each of the vortex holes 81 defines a channel extending along a main axis, through the wall of the diverging frustoconical portion 84. This channel is axially inclined downstream with respect to the longitudinal axis X-X of the injection system, comprising an axial component along the longitudinal axis X-X of the injection system. All the vortex holes 81 are inclined axially downstream with respect to the longitudinal axis X-X of the injection system at an angle γ which is, for example, equal to 45° with respect to the longitudinal axis X-X of the injection system With reference more specifically to FIG. 4, the channels defined by each of the vortex holes 81 each comprise a component circumferential to the outer wall of the mixing bowl 8 with respect to the longitudinal axis X-X of the injection system. The vortex holes 81 are circumferentially inclined at a pitch angle $β_2$ which is, for example, less than or equal to 60° relative to the longitudinal axis X-X of the injection system.

With reference more specifically to FIGS. 1, 2, 4 and 5, the vortex holes 81 are each circumferentially oriented in a second direction $R_2$ which is opposite to the first direction $R_1$ of the blades 70 of the swirler 7. In other words, the vortex holes 81 are configured to drive the air which is introduced there in a counter-rotating flow with that of the air which is introduced into the injection system 4 by the air inlet holes 73 of the swirler 7.

With reference to FIG. 5, the pressurised air which supplies the combustion chamber 2 is used for combustion or for cooling the combustion chamber 2. It comes from the diffuser 10.

A portion of this air is introduced into the flame tube of the combustion chamber 2 at the central opening of the fairing 24, while another portion of the air flows towards the air flow passages 11 and 12. The air supplying the injection system 4 flows from the central opening of the fairing 24, through in particular the swirler 7 of the injection system shown in FIG. 1 and holes 81, 83 which pass through the mixing bowl 8.

The air which enters the air inlet orifices 73 of the swirler according to the arrow 56 imparts a rotational movement according to the arrow 57 on the air-fuel mixture and contributes to the atomisation of the fuel.

The air and fuel mixture at the outlet of the converging portion 82 is radially confined by the air which is introduced into the vortex holes 81 according to arrow 58. The vortex holes 81 also impart on the mixture a rotational movement relative to the longitudinal axis X-X of the injection system, according to the arrow 59. They contribute to the atomisation of the fuel.

The deflector 10 is then, in particular, cooled by a film of cooling air which is directed towards the deflector 10 by the collar 87, after having passed through the cooling holes 83.

The flow of air in the passages 11 and 12 penetrates into the combustion chamber 2 via the primary orifices 51 and the dilution orifices 52.

Thanks to the vortex holes 81, injection system 4 can have only a sole swirler 7. The structure of the mixing bowl 8 according to the invention also removes the need for a venturi which is conventionally located between a swirler and the mixing bowl 8.

This results in a reduced size and a limitation of the mass of the injection system 4, while allowing satisfactory spraying of the air-fuel mixture into the combustion chamber 2. Furthermore, the injection system 4 tends to be easier to manufacture.

In particular, the atomisation of the air-fuel mixture into the combustion chamber 2 is satisfactory. There are no more problems with flow of the air-fuel mixture in a venturi which has been eliminated, in particular problems of liquid film on the inner wall of the venturi.

Due to the presence of a sole swirler and the absence of a venturi, the single swirler 7 of the injection system has a larger diameter around the longitudinal axis X-X of the injection system, and the diameter of the holes of the mixing bowl 8 formed by the vortex holes 81 is increased. The injection system 4 is easier to manufacture. It has a more limited mass and size.

Of course, various modifications can be applied by a person skilled in the art to the invention which has been described, without going beyond the scope of the disclosure of the invention.

Alternatively, the combustion chamber 2 is a combustion chamber of a turbopropeller or a turbojet engine, instead of being an annular combustion chamber 2 of a twin-spool turbofan.

Alternatively, the upstream retaining member 21 is a segment of radial wall which is rigidly attached to the deflector 27, in order to delimit the housing of the radial rim 89 of the mixing bowl. The upstream retaining member 21 thus forms a single piece with the deflector 27.

Alternatively, the combustion chamber 2 has no deflector 27. In this case, the injection system 4 has, in particular, no collar 87.

Alternatively, the housing socket 6 has air supply holes (not shown).

Alternatively, the housing socket 6 can be secured to the swirler 7, instead of being integral with the swirler 7.

Alternatively, the housing socket 6 is movably connected with respect to the swirler 7 and to the mixing bowl 8, in order to connect the injector nose 31 movably with respect to the swirler 7 and the mixing bowl 8. In this case, the housing socket 6 forms, in particular, a sliding bushing.

When the housing socket 6 is a sliding bushing, the mixing bowl 8 and the swirler 7 are, for example, secured to the chamber bottom 28 or to the deflector 27.

The number, shape and distribution of the blades 70 of the swirler is variable. In particular, the pitch angle $β_1$ can have variable values. The blades 70 can also be oriented in the second direction $R_2$. The blades 70 are, for example, configured to drive the air and fuel mixture in a co-rotating flow with that of the air which is introduced into the injection system 4 via the vortex holes 81.

The shape of the mixing bowl 8 is variable. For example, the values of the ratio of the axial length $l_1$ of the converging frustoconical portion 82 over the axial length $l_2$, the ratio of the angle $α_1$ of the converging frustoconical portion 82 over the angle $α_2$ of the diverging frustoconical portion 84, and/or the ratio of the average thickness $e_1$ of the outer wall of the converging frustoconical portion 82 over the thickness $e_2$ of the outer wall of the diverging frustoconical portion 84 close to the vortex holes 81, can vary. The diverging frustoconical portion 84 can be secured to the converging frustoconical portion 82.

The shape of the distribution of vortex holes 81 and of cooling holes 83 is variable. In particular, the vortex holes 81 can be located over more than one annular row, for example by being distributed over two annular rows. The vortex holes 81 can be oriented in a first direction $R_1$, instead of being oriented in the second direction $R_2$. Furthermore, at least some of the holes of the annular row 81a can have no circumferential component relative to the longitudinal axis X-X. The cooling holes 83 can be located over more than one annular row, for example by being distributed over two annular rows.

Alternatively, the fuel injector 3 is a multipoint injector. In this case, the combustion chamber 2 has, in particular, no primary orifices 51 and no dilution orifices 52.

What is claimed is:

1. An injection system for a turbomachine combustion chamber, wherein the injection system is not a multipoint injection system and wherein the injection system is configured to house a main fuel injector, the injection system comprising a single swirler, and no more than one single swirler, and an air-fuel mixing bowl, the single swirler comprising a plurality of blades which are distributed over an annular row,
   wherein the mixing bowl comprises a converging frustoconical portion and a diverging frustoconical portion around a longitudinal axis of the injection system, wherein the converging frustoconical portion is connected to the single swirler, wherein the diverging frustoconical portion is connected to the converging frustoconical portion forming a continuity in the aerodynamic profile between, on the one hand, a converging inner face of the converging frustoconical portion and, on the other hand, a diverging inner face of the diverging frustoconical portion,
   wherein the diverging frustoconical portion is passed through by vortex holes each defining a channel extending along a main axis, comprising an axial component extending along the longitudinal axis of the injection system and a circumferential component around the longitudinal axis of the injection system, wherein the axial component and the circumferential component are both non-zero,
   wherein the single swirler comprises a plurality of blades distributed over one annular row, wherein the injection system is devoid of a venturi, and wherein the mixing bowl comprises a radial wall segment configured to connect the mixing bowl to the combustion chamber, wherein the radial wall segment is configured to be axially located between an upstream retaining member of the combustion chamber and a deflector of the combustion chamber, in order to limit the axial movement of the injection system relative to a combustion chamber bottom.

2. The injection system according to claim 1, wherein the ratio of an axial length of the converging frustoconical portion over an axial length of the diverging frustoconical portion is less than 1.

3. The injection system according to claim 1, wherein the ratio of an angle of the outer wall of the converging frustoconical portion relative to the longitudinal axis of the injection system, over an angle of the outer wall of the diverging frustoconical portion relative to the longitudinal axis of the injection system is between 0.8 and 1.2.

4. The injection system according to claim 3, wherein the ratio of an angle of the outer wall of the converging frustoconical portion relative to the longitudinal axis of the injection system, over an angle of the outer wall of the diverging frustoconical portion relative to the longitudinal axis of the injection system is substantially equal to 1.

5. The injection system according to claim 1, comprising a housing socket configured to house an injector nose movably relative to the single swirler and the mixing bowl, wherein the housing socket is connected to the single swirler.

6. The injection system according to claim 1, wherein the vortex holes are all substantially distributed over at least one annular row around the longitudinal axis of the injection system.

7. The injection system according to claim 6, wherein the vortex holes are all substantially distributed over one sole annular row around the longitudinal axis of the injection system.

8. The injection system according to claim 1, wherein the vortex holes are axially closer to the outlet of the mixing bowl than to a connection area of the diverging frustoconical portion to the converging frustoconical portion.

9. The injection system according to claim 1, wherein the circumferential components of all the vortex holes are oriented in a same direction relative to the longitudinal axis of the injection system,
   wherein the vortex holes are circumferentially inclined at an angle which is less than or equal to 60° relative to the longitudinal axis of the injection system.

10. The injection system according to claim 1, wherein all the vortex holes are inclined axially downstream with respect to the longitudinal axis of the injection system at an angle which is substantially equal to 45° with respect to the longitudinal axis of the injection system.

11. The injection system according to claim 1, wherein the single swirler comprises blades which are each oriented circumferentially in a first direction around the longitudinal axis of the injection system,
   wherein the vortex holes are each oriented circumferentially in a second direction which is opposite to the first direction relative to the longitudinal axis of the injection system.

12. The injection system according to claim 1, wherein the mixing bowl comprises a collar and a connection spoiler,
   wherein the collar extends radially relative to the longitudinal axis and wherein the collar is located downstream of the diverging frustoconical portion,
   wherein the connection spoiler is configured to connect the mixing bowl to a a combustion chamber bottom, wherein the connection spoiler is connected to the diverging frustoconical portion extending upstream, wherein the connection spoiler is passed through by cooling orifices which are oriented axially towards the collar.

13. The injection system according to claim 1, wherein the mixing bowl comprises a collar and a connection spoiler,
   wherein the collar extends radially relative to the longitudinal axis and wherein the collar is located downstream of the diverging frustoconical portion,
   wherein the connection spoiler is configured to connect the mixing bowl to a deflector of the combustion chamber, wherein the connection spoiler is connected to the diverging frustoconical portion extending upstream, wherein the connection spoiler is passed through by cooling orifices which are oriented axially towards the collar.

14. A combustion chamber for a turbomachine, comprising an injection system according to claim 1.

15. The combustion chamber according to claim 14, comprising a chamber bottom, a deflector, an upstream retaining member and the injection system,
   wherein the injection system comprises a radial wall segment that is axially located between the upstream retaining member and the deflector, in order to limit the axial movement of the injection system relative to the combustion chamber bottom.

* * * * *